United States Patent

Porter, III et al.

[11] Patent Number: 5,966,460
[45] Date of Patent: *Oct. 12, 1999

[54] ON-LINE LEARNING FOR NEURAL NET-BASED CHARACTER RECOGNITION SYSTEMS

[75] Inventors: Gilbert B. Porter, III, Rochester; Zhigang Fan; Frederick J. Roberts, Jr., both of Webster, all of N.Y.

[73] Assignee: Xerox Corporation, Stamford, Conn.

[ * ] Notice: This patent issued on a continued prosecution application filed under 37 CFR 1.53(d), and is subject to the twenty year patent term provisions of 35 U.S.C. 154(a)(2).

[21] Appl. No.: 08/810,388

[22] Filed: Mar. 3, 1997

[51] Int. Cl.$^6$ ...................................................... G06K 9/62
[52] U.S. Cl. ........................... 382/159; 382/155; 382/156; 382/157; 382/158; 382/161; 382/187; 382/224; 382/227
[58] Field of Search .................................... 382/161, 155, 382/156, 157, 158, 159, 165, 190, 181, 187, 224, 225, 226, 227, 228

[56] References Cited

U.S. PATENT DOCUMENTS

| | | | |
|---|---|---|---|
| 4,551,851 | 11/1985 | Kochert | 382/38 |
| 5,195,169 | 3/1993 | Kamiya et al. | 395/23 |
| 5,212,767 | 5/1993 | Higashino et al. | 395/27 |
| 5,214,747 | 5/1993 | Cok | 395/27 |
| 5,222,194 | 6/1993 | Nishimura | 395/23 |
| 5,239,594 | 8/1993 | Yoda | 382/15 |
| 5,245,697 | 9/1993 | Suzuoka | 395/22 |
| 5,337,370 | 8/1994 | Gilles et al. | 382/14 |
| 5,418,864 | 5/1995 | Murdock et al. | 382/309 |
| 5,528,700 | 6/1996 | Takatori et al. | 382/157 |
| 5,542,006 | 7/1996 | Shustorovich et al. | 382/156 |
| 5,590,218 | 12/1996 | Ornstein | 382/157 |
| 5,638,491 | 6/1997 | Moed | 395/23 |

OTHER PUBLICATIONS

"Neural Nets for Computing", IEEE International Conference on Acoustics, Speech, and Signal Processing, 1981.

*Primary Examiner*—Leo H. Boudreau
*Assistant Examiner*—Kanji Patel
*Attorney, Agent, or Firm*—Gary B. Cohen; Philip E. Blair

[57] ABSTRACT

A neural network based improving the performance of an omni-font classifier by using recognized characters for additional training is presented. The invention applies the outputs of the hidden layer nodes of the neural net as the feature vector. Characters that are recognized with high confidence are used to dynamically train a secondary classifier. After the secondary classifier is trained, it is combined with the original main classifier. The invention can re-adjust the partition or boundary of feature space, based on on-line learning, by utilizing the secondary classifier data to form an alternative partition location. The new partition can be referred to when a character conflict exists during character recognition.

3 Claims, 2 Drawing Sheets

ON-LINE LEARNING FOR NEURAL NET-BASED CHARACTER RECOGNITION SYSTEMS

FIELD OF THE INVENTION

The invention is generally related to neural networks and, more particularly, to an on-line unsupervised neural net-based learning system which improves the performance of neural network character recognition systems by using recognized characters for additional training.

BACKGROUND OF THE INVENTION

Artificial neural networks (or simply "Neural Networks") and their applications are well known in the art. "Neural" comes from neurons, or brain cells. Neurons are built by imitating in software or silicon the structure of brain cells and the three-dimensional lattice of connections among them. Another technique utilizes mathematical algorithms or formulas to accomplish pattern recognition. Neural networks have a remarkable ability to discern patterns and trends too subtle or too complex for humans, much less conventional computer programs, to spot. Neural networks can perceive correlations among hundreds of variables, recognizing patterns, making associations, generalizing about problems yet to be experienced before, and learning by experience. Ordinarily, computers mechanically obey instructions written with uncompromising precision according to a set of rules; however, neural networks learn by example. For example, to teach a computer associated with a neural network to tell the differences between good or bad symbols, patterns, characters, etc., examples must be learned by the neural network. Once the neural network has seen enough examples, the neural network can direct another device to react appropriately to subsequent examples.

In an article by Richard P. Lippmann entitled "Neural Nets for Computing", IEEE International Conference on Acoustics, Speech, and Signal Processing, 1988, three feed-forward models are described. Single and multi-layer perceptions which can be used for pattern classification are disclosed by Lippmann, as well as Kohonen's feature map algorithm, as described by Kohonen et al. in "Phonotopic Maps—Insightful Representation of Phonological Features for Speech Representation," Proceedings IEEE 7th International Conference on Pattern recognition, Montreal, Canada, 1984, which can be used for clustering or as a vector quantizer.

U.S. Pat. No. 5,245,697, granted to Suzuoka describes a neural network processing apparatus that calculates average absolute values and utilizes the resulting average differences between the output values and a center value to set each neuron to a controlled function which allows the neuron network to correctly identify an unknown multivalued image pattern.

U.S. Pat. No. 5,222,194, granted to Nishimura, describes another method of modifying neuron weights and reaction coefficients by changing input and output characteristics of units and weights of links in accordance with outputs of the output layer and a particular rule.

U.S. Pat. No. 5,212,767, granted to Higashino et al., describes a multi-layer neural network having input, hidden and output layers and a learning method wherein a processor belonging to the hidden layer stores both the factors of multiplication or weights of links for a successive layer nearer to the input layer and the factors of multiplication or weights of links for a preceding layer nearer to the output layer. Upon forward or backward calculation, the access to the weights for successive layers among the weights stored in the processors of the hidden layer can be made by the processors independently from each other.

U.S. Pat. No. 5,195,169, granted to Kamiya et al., describes a control device for controlling the learning of a neural networks wherein weight values of synapse connections between units of the neural network are monitored during learning so as to update the weight values.

U.S. Pat. No. 5,214,747, granted to Cok, describes a neural network wherein a memory array stores the weights applied to each input via a multiplier, and the multiplied inputs are accumulated and applied to a lookup table that performs threshold comparison operations.

Neural networks have been joined to standard large optical character recognition systems to improve their recognition. Older systems used for automated processing of forms and documents were usually limited to reading typed or clearly printed numbers and block letters. Neural networks improve accuracy and recognize diverse characters. Neural networks have been used extensively for character recognition in both font specific and omni-font classifiers. Generally, character classification can be considered as a partition of the feature space into several subspaces, each of which corresponds to a particular character or common character feature. This is illustrated in FIG. 1, where the feature space is two-dimensional. In this example, two characters, say "A" and "B" (represented by small circles) are to be recognized. The two large circles represent various features of different "A"s and "B"s. The dashed line is the partition of the space of the classifier. Overlapping of the larger circles implies that certain character samples are indistinguishable in this 2-D feature space. Consequently, even a perfect classifier will make errors. The characters from a single document are likely to be from one or a few fonts, and have similar distortions. As a result, the characters from a single document tend to cluster in feature space, as shown in FIG. 1 by small circle "A".

While the prior art provides for character recognition, the art does not provide a means for reducing classifications errors during character recognition. Therefore, there is a need for a system which reduces classification errors during character recognition using neural networks. There is also a need for a system which reduces classification error during recognition of characters, patterns, symbols, or any other medium well known in the neural network art.

Therefore, the object of this invention is to provide a system and method that can reduce classification errors by temporarily re-adjusting the classification boundaries during character recognition or the recognition of other medium. It is further object of the invention to provide a means and method that can take advantage of on-line unsupervised neural network learning techniques to adjust the classification boundaries during the recognition process.

It should be appreciated that neural networks have many applications in the character, object, symbol, or pattern recognition art. The following disclosure will refer to all possible medium as "characters" which should not be taken in a limiting sense with regard to the applicability of the teachings herein. All of the references cited herein are incorporated by reference for their teachings.

SUMMARY OF THE INVENTION

To achieve the foregoing objects of the invention, and to overcome the shortcomings discussed above regarding classification errors during character recognition, an on-line unsupervised learning algorithm is presented which improves the performance of an omni-font classifier by using recognized characters for additional training. The invention applies the outputs of the hidden layer nodes of the neural net as the feature vector. Characters that are recognized with high confidence are used to dynamically train a secondary classifier. This secondary classifier can be a neural net layer, simple distance classifier, or some more complex classifier. After the secondary classifier is trained, it is combined with the original main classifier. The invention can re-adjust the partition located within the feature space of the neural network based on on-line learning by utilizing the secondary classifier data to form an alternative partition location. The new partition can be referred to when there is a conflict in character recognition—where the character is classified with low confidence.

The Advantages of the invention are the improvement of classification systems by using on-line unsupervised learning through artificial neural network technology. By using an artificial neural network with the adaptive technique disclosed herein, error rates in optical character recognition are reduced.

The character recognition system uses means known in the art for capturing characters to be learned and analyzed by an artificial neural network system. The artificial neural network system of the present invention includes primary and secondary classifications. Training characters are initially learned by the artificial neural network system through the primary classification. Subsequent characters recognized by the character recognition system with "high confidence" and related to the training characters are re-learned by said artificial neural network system through the secondary classification. During operation candidate characters received by the character capturing means to be learned and recognized are initially compared to the training characters within the primary classification and are identified (matched) if the characters are recognized with high confidence. If the candidate characters are not recognizable using the primary classification, then they are compared to previously recognized characters within the secondary classification wherein the candidate characters are identified.

SUMMARY OF THE INVENTION

The preferred embodiments and other aspects of the invention will become apparent from the following description to illustrate a preferred embodiment of the invention when read in conjunction with the accompanying drawings which are provided for the purpose of describing an embodiment of the invention and not for limiting same, in which.

DETAILED DESCRIPTION OF THE PREFERRED EMBODIMENT OF THE INVENTION

Figure 1:
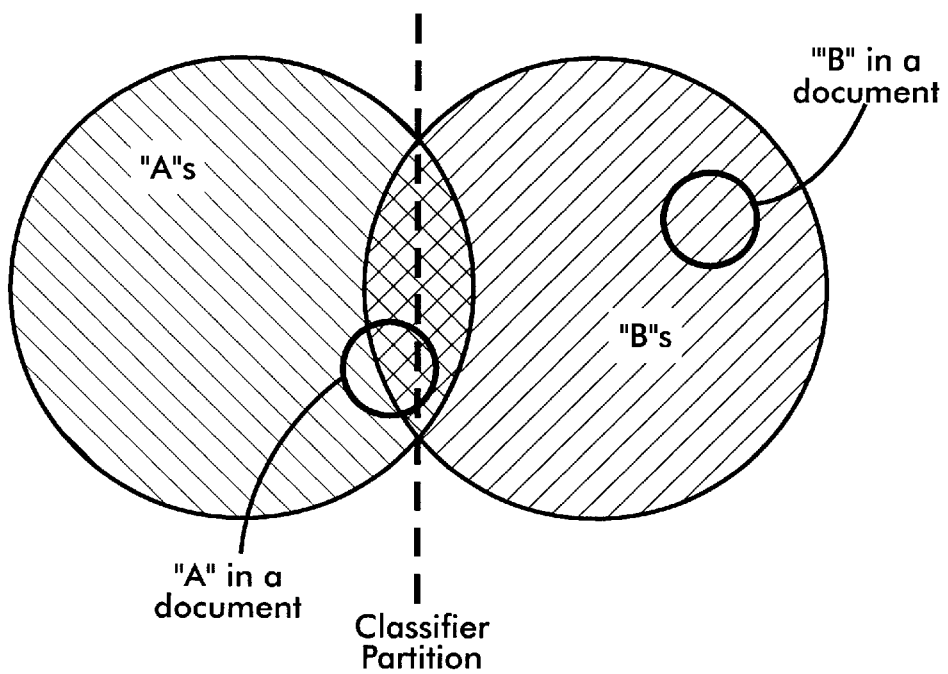
FIG. 1 is a graphical illustration of two dimensional feature space known in the art wherein two characters are to be recognized with the two large circles representing character features of different "A"s and "B"s, and a fixed partition feature spaced is depicted by a dashed line.
Figure 2:
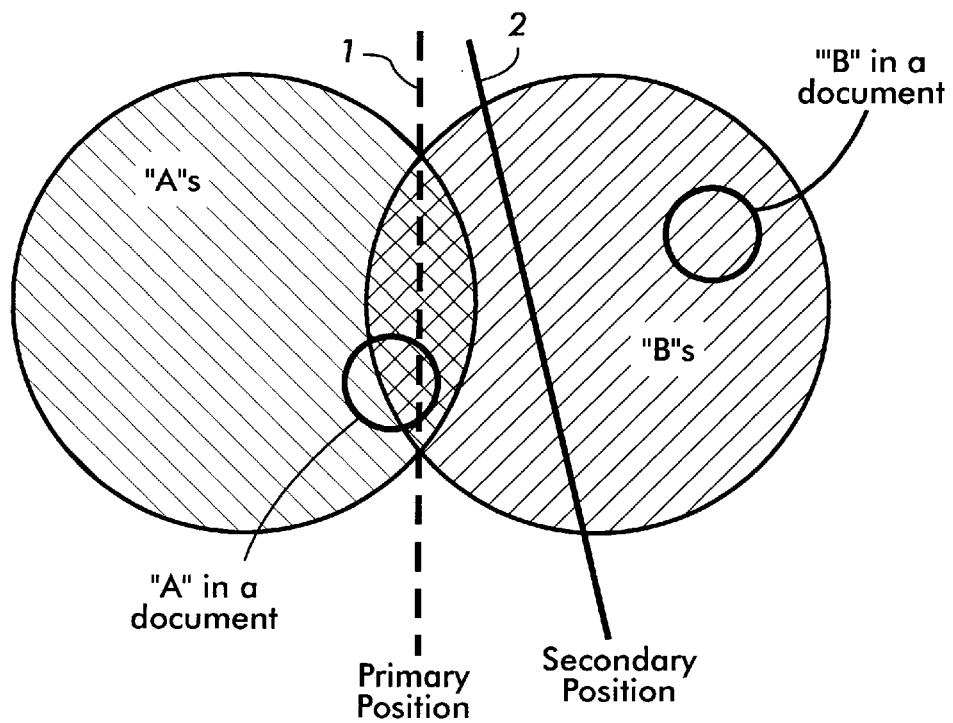
FIG. 2 is a graphical illustration of two dimensional feature space as illustrated in FIG. 1 that has been modified by application of the invention to provide for a alternate partition depicted by a dashed line.

The invention recognizes stationary fonts continuously and uses already recognized characters to improve subsequent recognition of characters. The inventive method utilized by the present invention can be broken into two major steps: 1) initial training and 2) on-line continuous learning. First the system is generally trained for omni-fonts and particular characters or symbols (hereinafter "characters") that it must recognize. These characters typically do not have flaws, variations or deviations. This training is typical in the character or pattern recognition art. Then the system learns subsequent characters on-line in order to provide an adaptable tool that can better recognize variations in characters or characteristics of a particular font that are sometimes interferred with by, for example, noise. Relying on boundaries of character positions that are in memory, the system compares newly acquired characters against the stored boundaries. Feature extraction from a bit map occurs to determine which class the character falls into within the feature space. The character is classified based on feature extraction and comparison. It is at this point that error in recognition may be made. The reason for the errors are because features of the character fall outside the partitioned boundary of which it belongs. Referring to FIG. 2, two characters, "A" and "B", represented by the smaller circles are to be recognized within the feature space which is two-dimensional. The two larger circles represent various features of different "A"s and "B"s known by the system. The dashed line is the standard/primary partition 1 of the feature space for the classifier. Overlapping of the circles implies that certain character samples are indistinguishable in this 2-D feature space 1. Consequently, even a perfect classifier will make errors. The characters from a single document are likely to be from one or a few fonts, and may have similar distortions. As a result, the characters from a single document tend to cluster in feature space 1, as shown in FIG. 1 by small circle "A" which falls within the overlap area.

The invention applies the outputs of the hidden layer nodes of the neural net as the feature vector. Characters that are recognized with high confidence are used to dynamically train a secondary classifier. This secondary classifier can be a neural net layer, simple distance classifier, or some more complex classifier. After the secondary classifier is trained (typically 5–10 samples per character are sufficient), it is combined with the original main classifier. The secondary classifier results in an alternate partition 2 (shown as a solid line) being formed within the feature space.

During subsequent character recognition, a character that is recognized with low confidence by the main classifier is sent to the secondary classifier, defined by boundaries within the secondary partition 2, for further checking. A weighted distance classifier can be adopted as the secondary classifier. Specifically, the distance measure between the test character and the training samples for i-th character can be calculated as:

$$d_i = \Sigma_j (fj - \mu ij) 2 / \sigma^2_{ij}$$

where fj is a test character's j-th feature, $\mu$ij and $\sigma^2_{ij}$ are the j-th feature's sample mean and sample variance of the training data for the i-th character. Experiments have showed that the combined classifier (using the secondary partition 2) outperformed the original omni-font neural classifier in different degrees for different test documents.

A fixed classification boundary cannot exploit the similarity of characters in fonts and distorsions within a document. For example, referring to FIG. 1, the error or ambiguity of seen in populations based on overlap within feature space is the result of fixed partitions such as the primary partition 1. As described above, the invention can readjust the partition based on on-line learning because an alternative partition location is determined by the neural network, and this partition can be referred to when there is ambiguity in character recognition.

Figure 3:
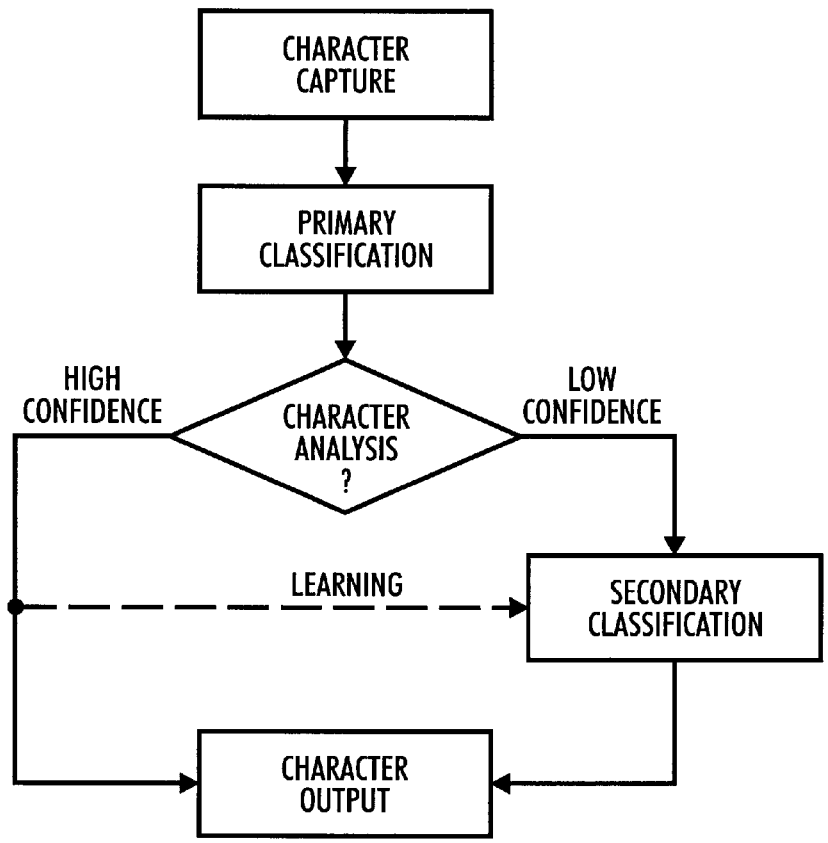
FIG. 3 is a flow chart for the method of the invention.

Referring to the flow chart of FIG. 3, candidate characters are first captured with a character capturing means known in the art of character recognition. The candidate characters must then be processed by the character recognition system wherein the candidate characters are analyzed by comparing the candidate character to primary or secondary classification systems of the neural network to determine a match for the candidate characters. The test is as follows:

- If a sample character is classified with high confidence, then a character match is determined and provided to the character recognition system for processing; the sample may also be used for learning which will result in an alternative partition being formed for subsequent use.
- If the character is classified with low confidence, then the alternative partition is referred to and used resulting in re-classification for the character with high confidence.

Through this test sequence, the candidate characters are compared by the system to training characters stored within the primary classification memory of the neural network to find a match if said candidate characters are recognized with high confidence, or are compared by the system to previously recognized (post-training) characters that were stored within the neural networks secondary classification memory to find a match using the secondary partition if the candidate characters are recognized with low confidence. When a matching character for the candidate character is finally determined the character is provided through said character recognition system to a character generating system which may be, for example, memory or rendering apparatuses known in the art.

Figure 4:
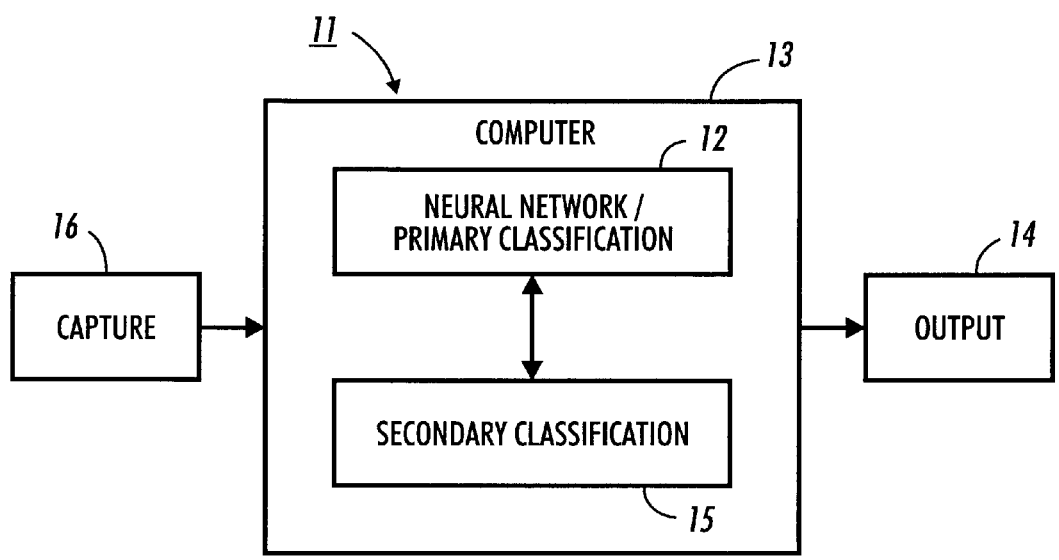
FIG. 4 is a block diagram illustrating the system components for the invention.

Referring to FIG. 4, the system components required for the disclosed invention is generally familiar in the art of artificial neural networks as applied in the character recognition field. The character recognition system 11 typically comprises a neural network 12 having a primary classification embodied within a computer system 13 and a means for capturing 16 or otherwise providing a character to be recognized. Distinct features of the invention, however, further provide a secondary classification 15 as part of the neural network 12. Training characters are initially learned by said artificial neural network system and stored in (remembered by) said primary classification. Characters recognized by said character recognition system with high confidence and are related to the training characters are re-learned by the artificial neural network system and are then stored in (remembered by) the secondary classification 15. Character analysis occurs with components known in the art for analyzing and recognizing candidate characters; however, the system disclosed herein further analyzes candidate characters received by known means for capturing characters 16 to be learned and recognized by enabling a comparison to training characters of the primary classification or recognized characters of the secondary classification 15 depending on whether the candidate character is recognized with high confidence or low confidence as described above. Means for outputting and generating recognized characters 14 through said character recognition system are also known in the art and can be applied to the candidate character once recognized by the invention.

While the invention is described with reference to a particular embodiment, this particular embodiment is intended to be illustrative, not limiting. Various modifications may be made without departing from the spirit and scope of the invention as defined in the amended claims. Modifications and alterations will occur to others upon reading and understanding this specification; therefore, it is intended that all such modifications and alterations are included insofar as they come within the scope of the appended claims or equivalents thereof.

We claim:

1. A character recognition system, comprising:

means for capturing characters to be analyzed;

an artificial neural network system including at least one primary classifier comprising a primary classification memory means and at least one secondary classifier comprising a secondary classification memory means, said artificial neural network system learning a first set of characters and storing the first set of characters in said primary classifier and said artificial neural network system storing a second set of characters related to the first set of characters in said secondary classifier; and a character analyzer for analyzing candidate characters captured by said capturing means, said character analyzer causing candidate characters to be compared with said first set of characters stored in said primary classifier when said candidate characters are recognizable with a high degree of confidence said high degree of confidence being used to dynamically train said secondary classifier, and said character analyzer causing candidate characters to be compared with said second set of characters stored in said secondary classifier when said candidate characters are recognizable with a low degree of confidence.

2. The character recognition system of claim 1, in which a candidate character matches a character in one of the first set and the second set, further comprising a character rendering subsystem for rendering the candidate character which matches the character in the one of the first set and the second set.

3. The character recognition system of claim 1, wherein the second set of characters in the second classification memory are learned twice in said artificial neural network.

* * * * *